(12) United States Patent
Taub et al.

(10) Patent No.: US 10,713,969 B2
(45) Date of Patent: Jul. 14, 2020

(54) TRAILER SWAY DEMONSTRATOR

(71) Applicants: Steve Taub, Anthem, AZ (US); James D. Fait, Phoenix, AZ (US); Marco Garcia, Chandler, AZ (US); Javier Nolasco, Phoenix, AZ (US); Edwin Dale Beck, III, Tempe, AZ (US); Luis Paul Vendrell, Tempe, AZ (US)

(72) Inventors: Steve Taub, Anthem, AZ (US); James D. Fait, Phoenix, AZ (US); Marco Garcia, Chandler, AZ (US); Javier Nolasco, Phoenix, AZ (US); Edwin Dale Beck, III, Tempe, AZ (US); Luis Paul Vendrell, Tempe, AZ (US)

(73) Assignee: U-HAUL INTERNATIONAL, INC., Phoenix, AZ (US)

(*) Notice: Subject to any disclaimer, the term of this patent is extended or adjusted under 35 U.S.C. 154(b) by 213 days.

(21) Appl. No.: 15/656,134

(22) Filed: Jul. 21, 2017

(65) Prior Publication Data

US 2018/0025662 A1    Jan. 25, 2018

Related U.S. Application Data

(60) Provisional application No. 62/365,231, filed on Jul. 21, 2016.

(51) Int. Cl.
*G09B 9/048* (2006.01)
*G09B 9/00* (2006.01)
*G09B 9/04* (2006.01)
*G09B 9/058* (2006.01)
(Continued)

(52) U.S. Cl.
CPC ............... *G09B 9/048* (2013.01); *G09B 9/00* (2013.01); *G09B 9/02* (2013.01); *G09B 9/04* (2013.01); *G09B 9/052* (2013.01); *G09B 9/058* (2013.01)

(58) Field of Classification Search
None
See application file for complete search history.

(56) References Cited

U.S. PATENT DOCUMENTS

| 3,581,668 A | 6/1971 | Ingels |
| 4,218,846 A | 8/1980 | Lahr |
| 4,695,266 A | 9/1987 | Hui |

(Continued)

FOREIGN PATENT DOCUMENTS

EP    1 310 280 A2    5/2003

OTHER PUBLICATIONS

Youtube, "Caravan Stability Studies", accessed at: https://www.youtube.com/watch?v=PFzrWHTG5e8 (published Jan. 2009).*

(Continued)

*Primary Examiner* — James B Hull
(74) *Attorney, Agent, or Firm* — Richard E. Oney; Venjuris, P.C.

(57) ABSTRACT

An apparatus for simulating a vehicle traveling on a road and towing a trailer, wherein the apparatus includes a scale model towing vehicle and trailer combination positioned on a moving belt of a treadmill. The apparatus has a speed control and a remote control steering mechanism to demonstrate how the vehicle/trailer towing combination will react to vehicle operator inputs under varying conditions, including variations in weight distribution of the trailer load.

8 Claims, 14 Drawing Sheets

(51) Int. Cl.
  *G09B 9/052*   (2006.01)
  *G09B 9/02*    (2006.01)

(56) References Cited

U.S. PATENT DOCUMENTS 5,626,362 A   5/1997  Mottola
8,262,431 B2  9/2012  Nakano et al.

OTHER PUBLICATIONS

Youtube, "RC car treadmill spin", accessed at: https://www.youtube.com/watch?v=AmrlM4JmrSs (published Jun. 2010).*
U-haul, "U-Haul Propane, Safe Trailering Simulator a Hit with Racing Fans", accessed at: http://myuhaulstory.com/2015/11/19/u-haul-propane-safe-trailering-simulator-hit-racing-fans/ (published Nov. 2015).*

* cited by examiner

FIG. 14

TRAILER SWAY DEMONSTRATOR

RELATED APPLICATION

This patent application claims the benefit of U.S. Provisional Application No. 62/365,231, filed Jul. 21, 2016, entitled "Trailer Sway Simulator," which is incorporated herein by reference.

BACKGROUND

This invention generally relates to tools for educating customers who rent moving trailers. More particularly, it relates to an apparatus for simulating a vehicle traveling on a road and towing a trailer, wherein the apparatus includes a scale model towing vehicle and trailer combination positioned on a moving belt of a treadmill. The apparatus has a speed control and a remote control steering mechanism to demonstrate how the vehicle/trailer towing combination will react to vehicle operator inputs under varying conditions, including variations in weight distribution of the trailer load.

Many of the public have misconceptions about the cause and prevention of towing related accidents and the importance of trailer loading. It is an object of the present invention to provide an educational tool to help dispel these misconceptions by educating persons who use moving trailers as to how a vehicle/trailer combination will react under certain towing conditions.

Another object of the present invention is to provide a simulator that can physically demonstrate the importance of properly loading a trailer as well as showing the corresponding relationship of speed and avoidance of towing related crashes.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided an apparatus for simulating a vehicle traveling on a road and towing a trailer. In one embodiment, the apparatus includes a motorized belt with a surface movable at a variable speed in a longitudinal direction and a support frame including a cross member disposed above the motorized belt. A model towing vehicle is positioned on the belt movable surface and includes a vehicle steering assembly for turning the front wheels of the vehicle and a servo motor adapted to control the steering assembly in response to a servo control signal. The model towing vehicle is coupled to the frame cross member via a coupling arm so that the vehicle can move laterally when the motorized belt is in motion in the longitudinal direction. A model trailer is adapted for coupling to the rear end of the model towing vehicle and includes removable weights for simulating weight distribution in a life size trailer. A steering control assembly includes a steering wheel and a servo driver configured to provide the servo control signal in response to the operation of the steering wheel. In this configuration, when the motorized belt moves in the longitudinal direction, an operator can operate the steering control mechanism to steer the model towing vehicle laterally with respect to the motorized belt.

In an advantageous embodiment, the steering wheel is disposed in a generally vertical orientation to the rear of the model towing vehicle. The apparatus can include a camera for capturing track level images of the operation of the model towing vehicle or the model trailer. The support frame can be mounted to a storage box bottom platform configured to mate with a storage box top section that is configured to fit over and encase the apparatus.

A trailer sway simulator according to the present invention provides an educational tool that can be used to educate the public on the importance of properly loading a trailer by demonstrating the stability of such a trailer as well as the instability of an improperly loaded trailer. By demonstrating the reaction of vehicle/trailer towing combinations that have different trailer load distributions, it allows the potential driver to see the stability of a properly loaded trailer in comparison to an improperly loaded trailer. By allowing a user to manually steer the model towing vehicle, the simulator can simulate how a specific vehicle/trailer towing combination will react to driver inputs under the modeled conditions. With this visual education tool, customers are less likely to improperly load their trailer, which should result in fewer crashes from vehicles towing trailers.

A trailer sway simulator according to the present invention can also physically demonstrate the relationship between towing speed and the likelihood of a crash with an improperly loaded trailer as well as the importance generally of reducing vehicle speed, particularly in the case of a trailer sway or whipping situation; it can be used to disprove the misconception held by some people of increasing speed to reduce trailer sway or whipping.

Because the simulator can be used with model trailers having single or double axle configurations, different axle locations, and different tongue lengths, it can help teach how towing combinations with these different trailer configurations will react differently under the modeled conditions. Moreover, the simulator can be customized to show the impact of misaligned trailer axles or other variable trailer conditions and the effect if such conditions on stability of the towing combination.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

It will be appreciated that terms such as "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention. The term "generally" as used in this specification is defined as "being in general but not necessarily exactly or wholly that which is specified." For example, "generally perpendicular" is used herein to indicate components that are in general, but not necessarily exactly or wholly, perpendicular.

In the drawings, the reference numeral 10 designates a trailer sway simulator in accordance with the invention. Referring to FIGS. 1-8, one embodiment of the sway simulator 10 includes a treadmill assembly 12 having a support frame 13 that supports a belt 14 that can be driven at a selected speed by a suitable drive mechanism (generally an electric motor and gear system) (not shown) of the type that is used in exercise treadmills. The support frame 13 includes a cross member 16 that is disposed above the belt surface 15. A coupling arm 21 is rotatably attached at one end to the cross member 16 and at the other end to the scale model towing vehicle 20, with the vehicle positioned on the belt surface 15. The model towing vehicle 20 includes a frame 22 (see FIG. 6) and a removable body shell 23. A model trailer 40 is hitched to the rear of the model towing vehicle 20.

A control panel 17 permits the user to select the speed at which the belt 14 is driven and includes a display 18 for displaying a speed of belt surface 15 relative to the model towing vehicle 20 based on the selected drive speed of the belt 14. When the belt drive mechanism is turned on, the belt surface 15 moves in the direction D shown in FIG. 1, thereby providing relative movement between the belt surface 15 and the model towing vehicle 20 and trailer 40 to simulate the movement of a towing vehicle/trailer combination over a road surface. As the belt surface 15 moves, the model towing vehicle 20 can be remotely steered by a user with a steering wheel 52 as described in more detail below.

Figure 3:
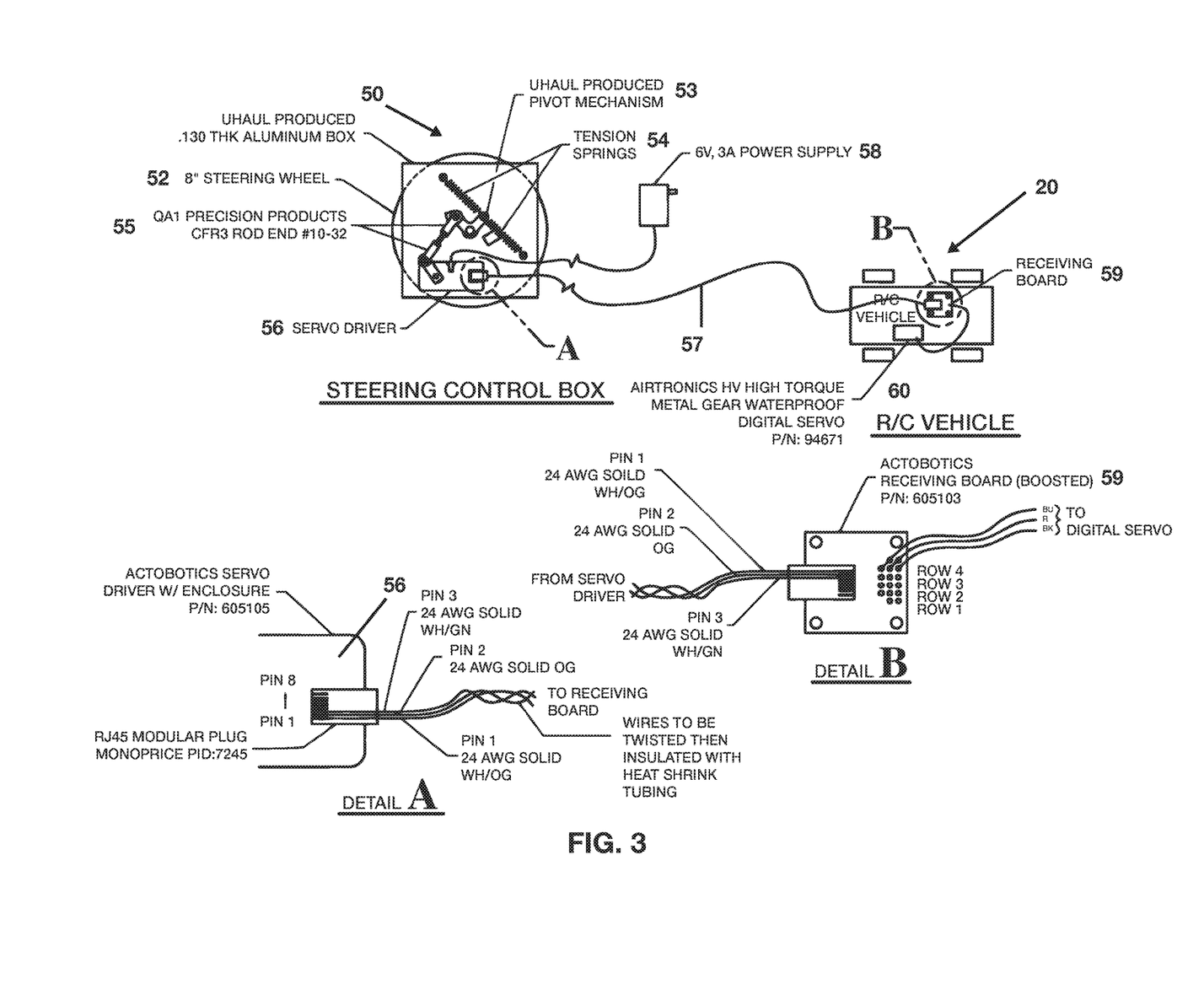
FIG. 3 is a wiring diagram showing the steering control assembly and model towing vehicle of the trailer sway simulator embodiment of FIG. 1.
Figure 4:
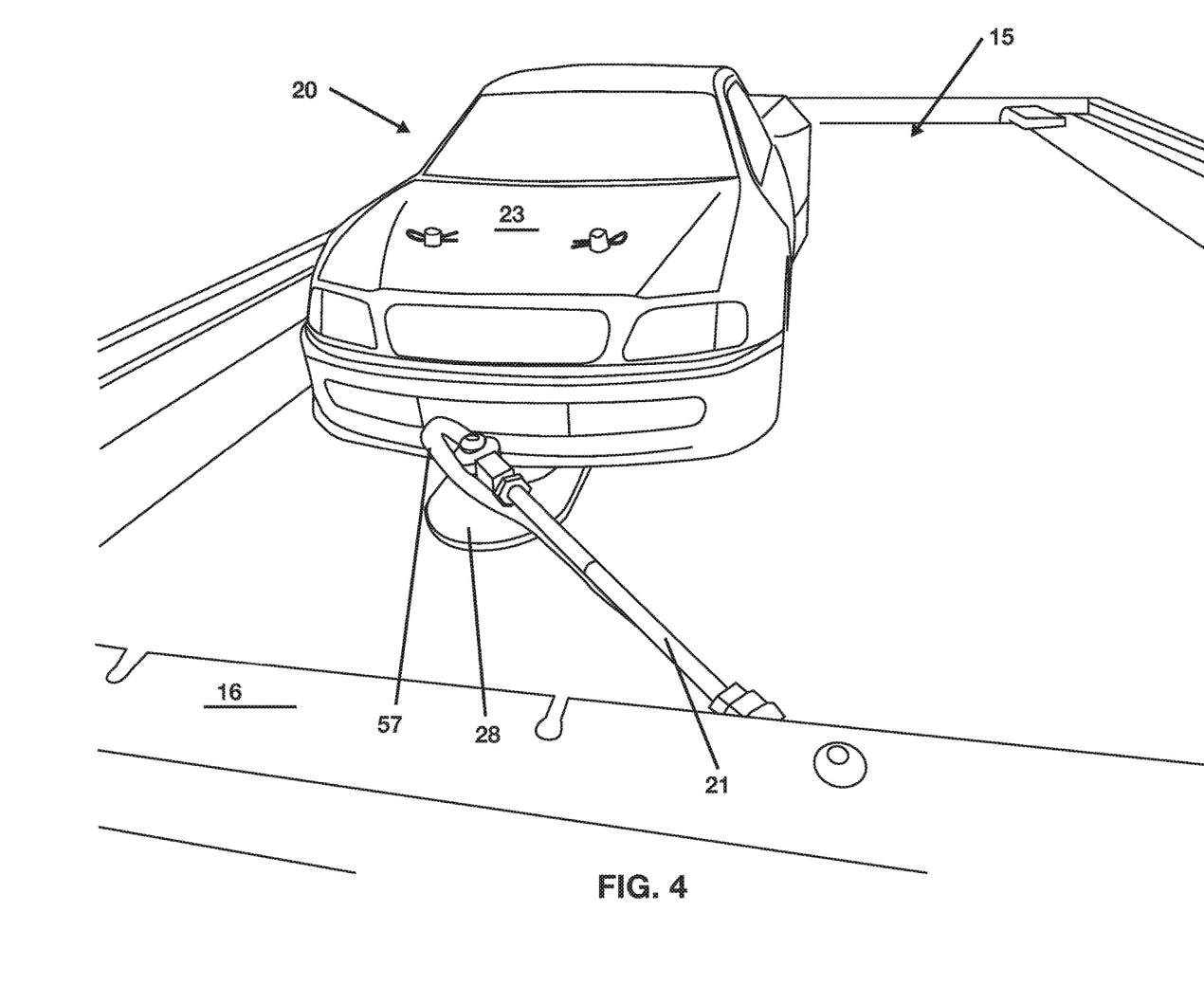
FIG. 4 is a perspective front view of the model towing vehicle of the embodiment of FIG. 1 showing the the vehicle connected to the frame cross member via the coupling arm.
Figure 5:
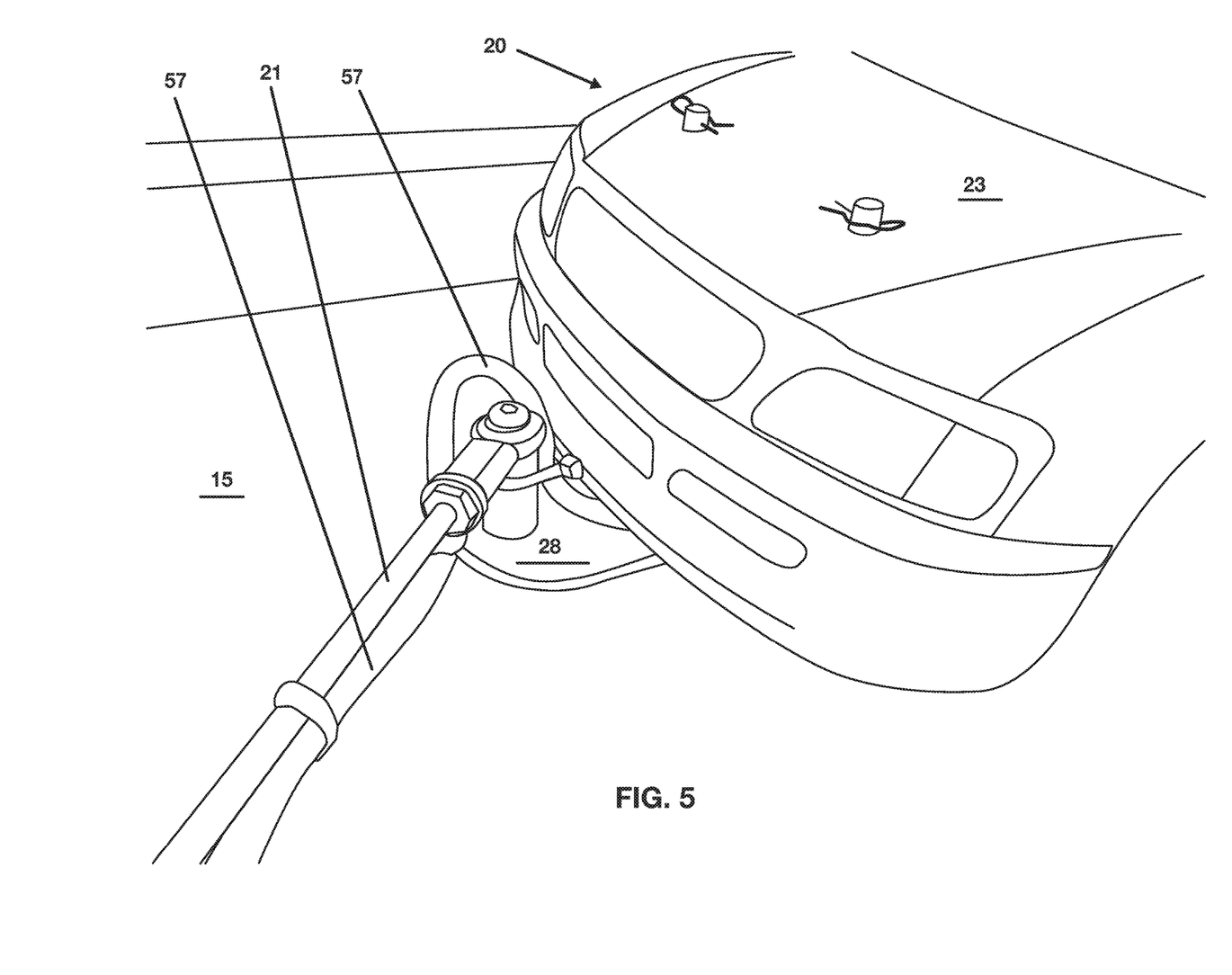
FIG. 5 is an enlarged perspective view of the front end of the model towing vehicle of FIG. 4 showing the connection between the coupling arm and the front end of the vehicle frame.
Figure 6:
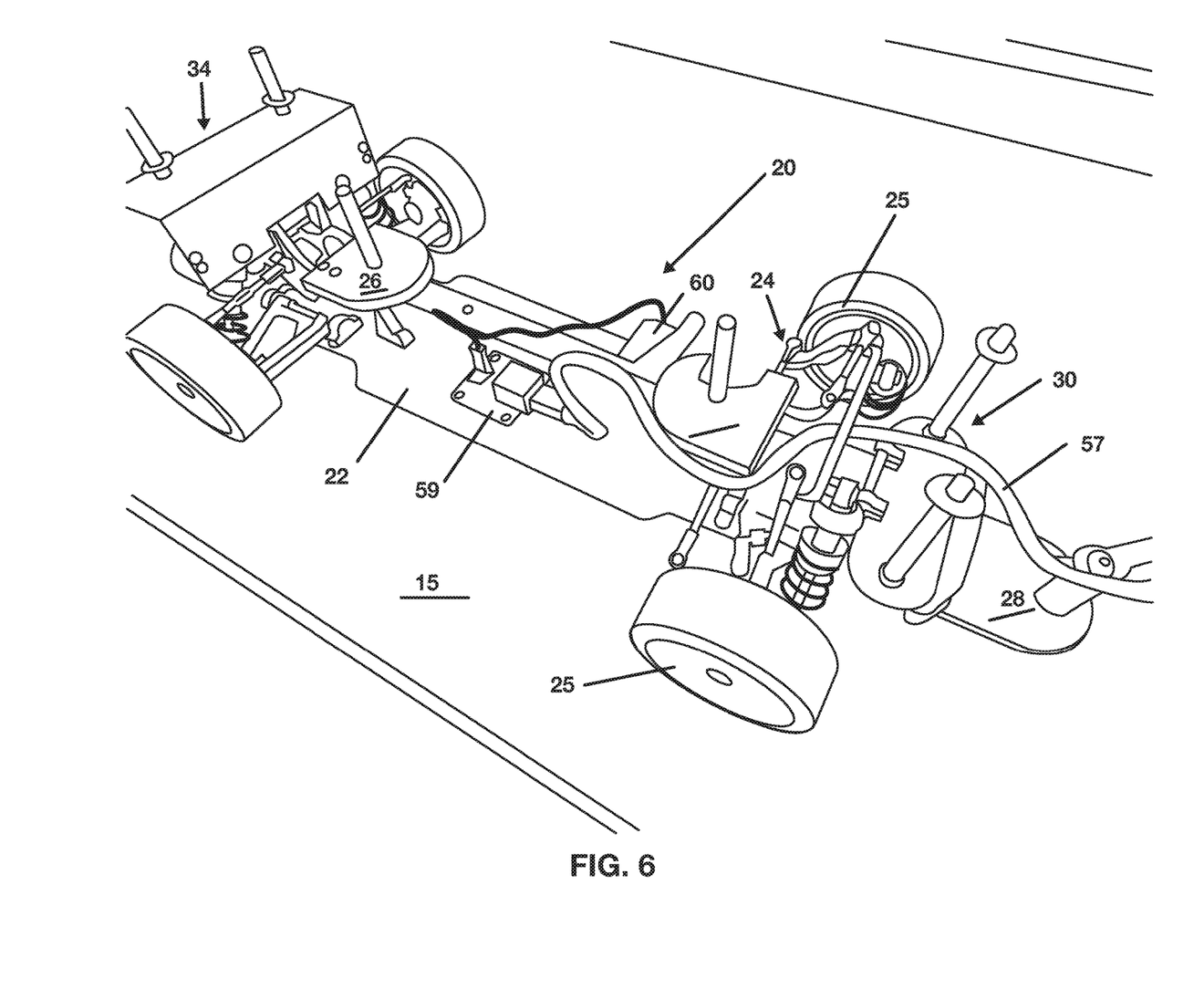
FIG. 6 is a perspective view of the model towing vehicle of the embodiment of FIG. 1 with the body shell removed and showing the vehicle frame and the components mounted to it.
Figure 7:
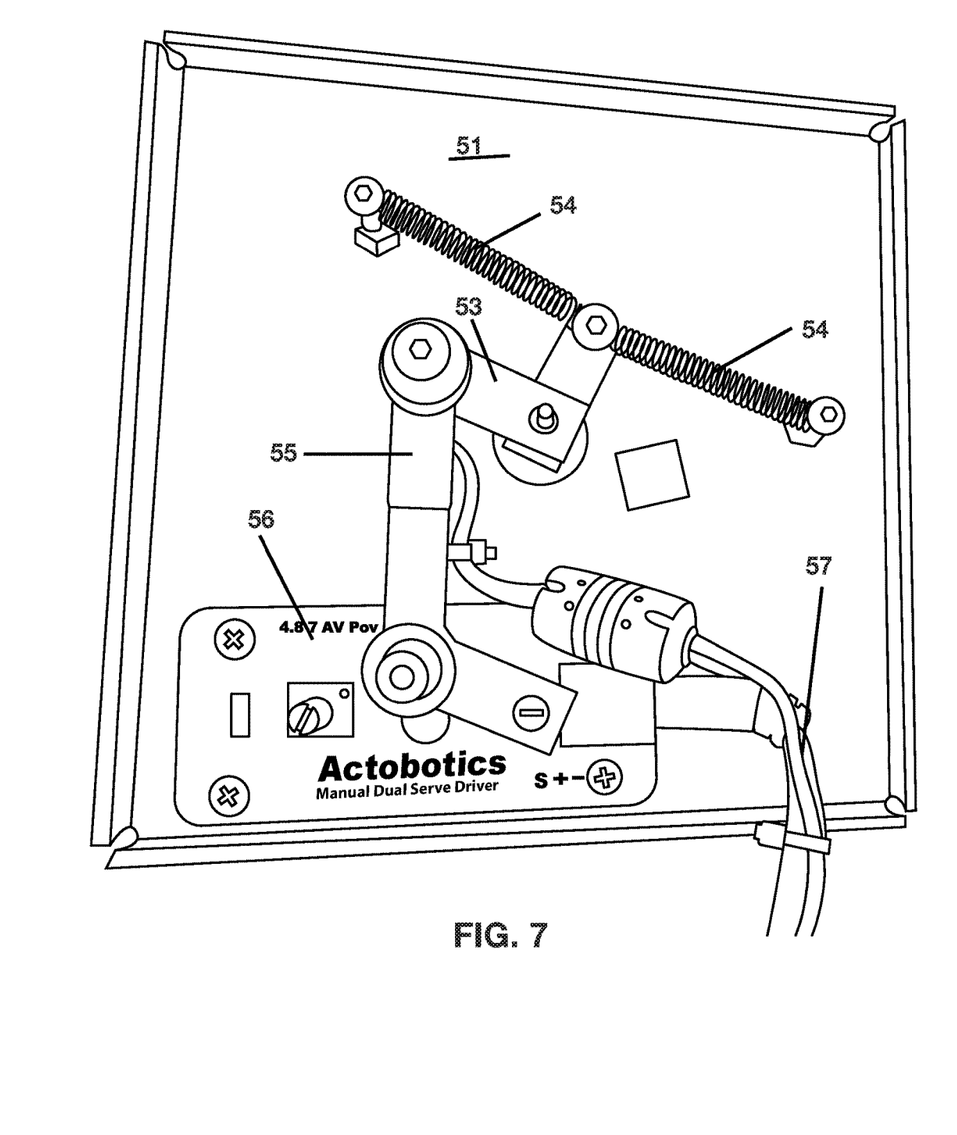
FIG. 7 is a bottom view of the top cover of the steering control box of the embodiment of FIG. 1 showing components of the control box.

Referring to FIGS. 3 and 6, a vehicle steering assembly 24 is mounted to the towing vehicle frame 22 and can turn a set of front wheels 25 to steer the vehicle. A vehicle servo motor 60 is mechanically coupled to and controls the vehicle steering assembly 24 to turn the vehicle front wheels 25. Removable weights 26 are mounted to the towing vehicle frame 22 and are selected and placed to simulate the weight distribution of an actual, life-size towing vehicle. The frame 22 has a front connector 28 attached to the frame front end 30 for rotatably connecting to the coupling arm 21 and a tow hitch 32 (see FIGS. 1 and 8) attached to the rear end 34 for coupling to the model trailer 40.

Figure 1:
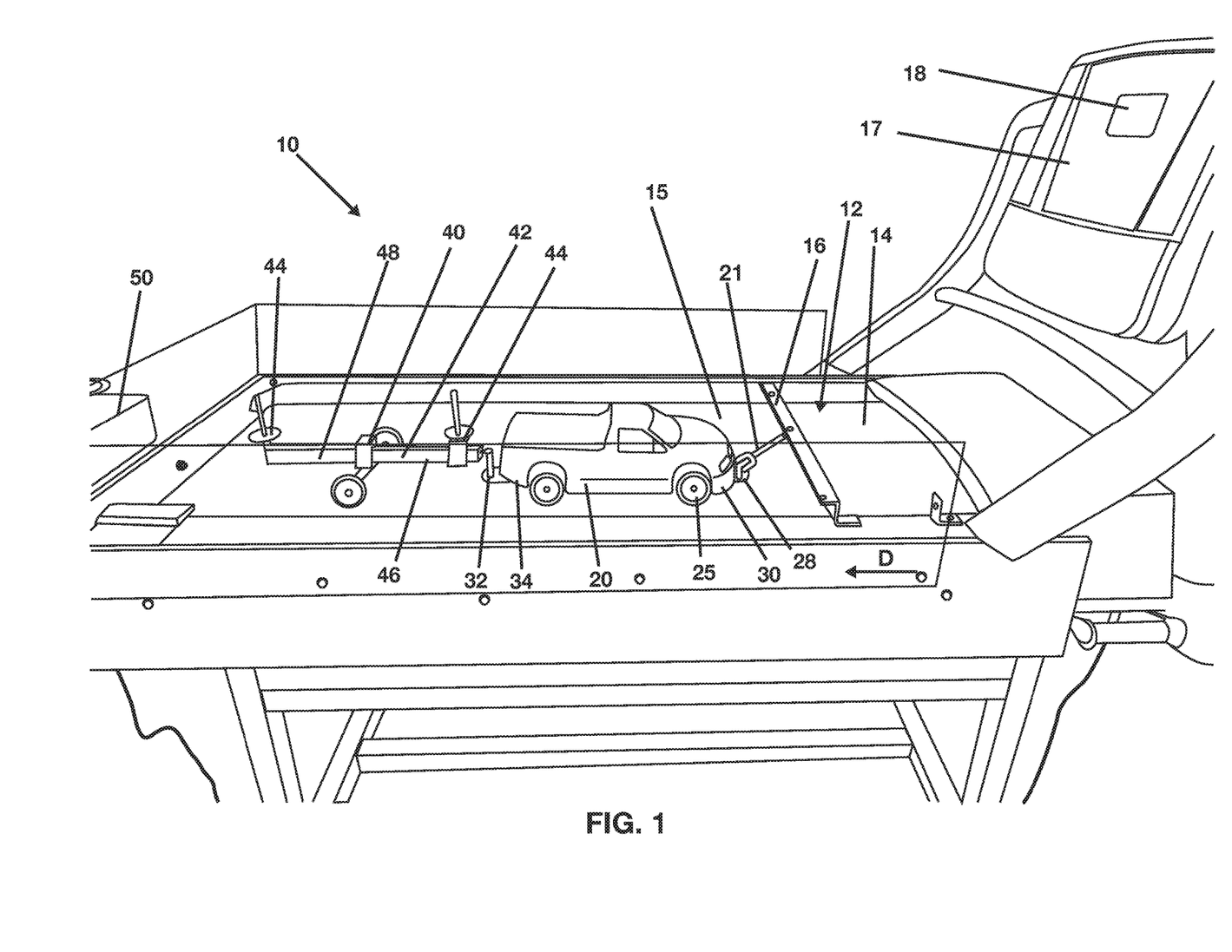
FIG. 1 is a side perspective view of one embodiment of a trailer sway simulator according to the present invention, showing the model towing vehicle and model trailer positioned on the motorized belt surface of the apparatus.
Figure 2:
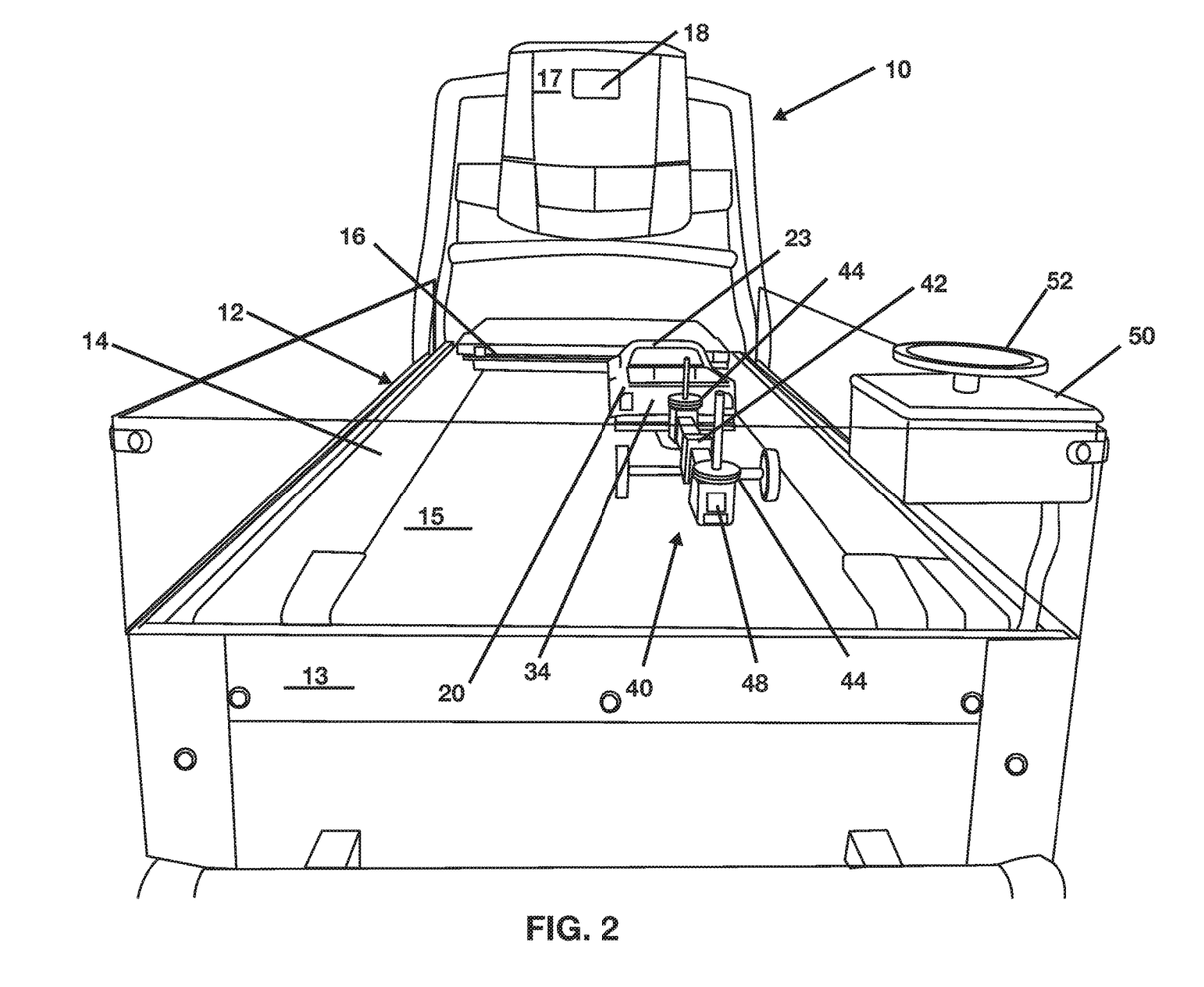
FIG. 2 is an end perspective view of the trailer sway simulator embodiment of FIG. 1.
Figure 8:
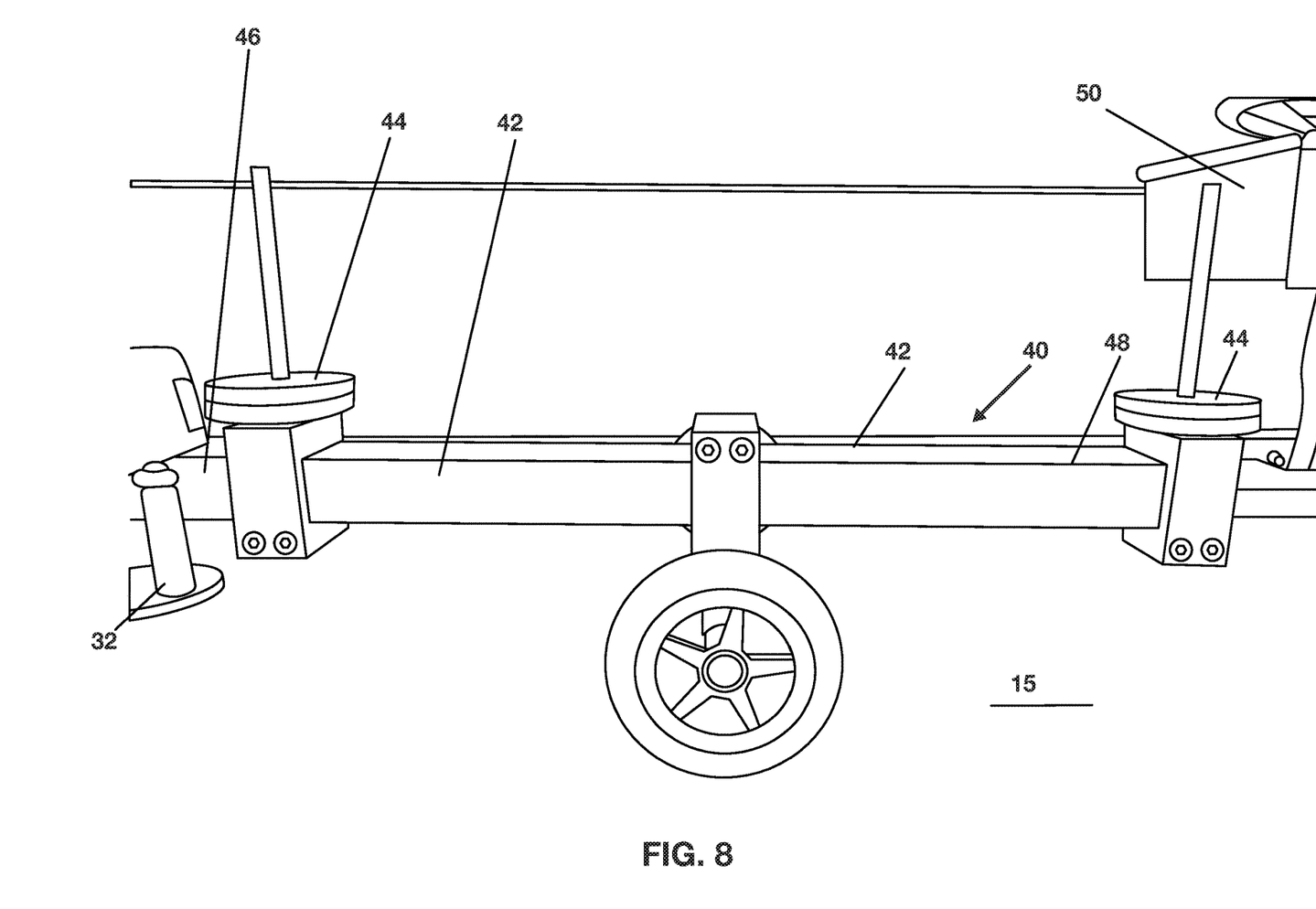
FIG. 8 is a side view of the single-axle model trailer of the embodiment shown in FIG. 1.
Figure 9:
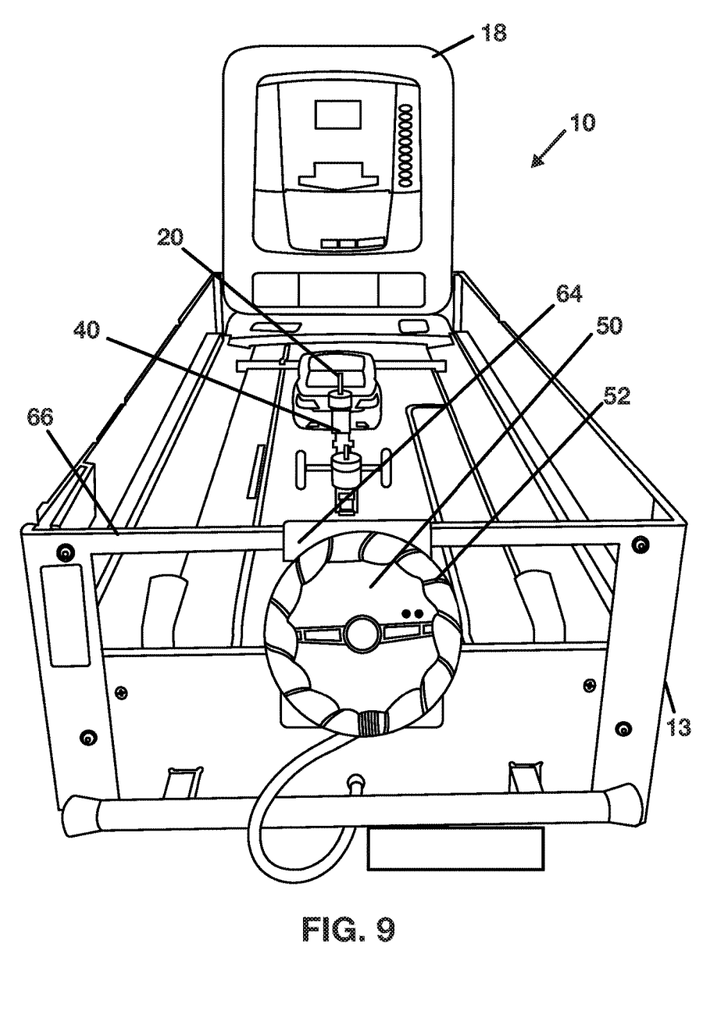
FIG. 9 is an end perspective view of another embodiment of a trailer sway simulator according to the present invention.

Referring to FIGS. 1-2 and 8, the model trailer 40 includes a frame 42 to which removable weights 44 can be mounted near the trailer front end 46 and rear end 48 to simulate load distribution in an actual, life-size trailer. Although the model trailer 40 shown in the figures has a single-axle configuration, it will be understood upon reading this specification that other configurations (e.g., a double-axle configuration and configurations with different tongue lengths) can be used to model various configurations of actual, life-size trailers.

Referring to FIGS. 2-3 and 8, a user steering control assembly 50 is mounted to the simulator support frame 13 and includes a steering wheel 52 which an operator can use to turn the vehicle front wheels 25 and steer the model towing vehicle 20 when the belt 14 is moving. As shown in FIGS. 3 and 8, an L-shaped pivot arm 53 is mounted to the shaft of the steering wheel 52. One end of the pivot arm 53 is mounted to two tension springs 54, which provide a suitable resisting force when the steering wheel 52 is turned in either direction. The other end of the pivot arm 53 is coupled via a linking mechanism 55 to a servo driver 56. The linking mechanism 55 translates the rotational motion of the steering wheel to a rotating input knob of the servo driver 56, which in turn outputs a servo control signal in response to the rotation of the input knob. The servo driver 56 is powered by a power supply 58. The servo driver 56 is electrically coupled to a vehicle servo motor 60 on the model towing vehicle 20 via control signal wires 57 connecting the output of the server drive 56 to a receiving board 59 on the model towing vehicle 20. The receiving board 59 receives the control signal from the servo driver 56 and in response to that signal, controls the vehicle servo motor 60 to turn the vehicle front wheels 25. In this configuration, a user can remotely steer the model towing vehicle 20 with the steering wheel 51.

Appendix A and Appendix B provide additional information regarding a suitable servo driver, receiving board and servo that have been used in one embodiment of the sway simulator 10.

FIGS. 9-14 show another in one embodiment of the trailer sway simulator 10. As shown in to FIGS. 9-12, in this embodiment the steering control assembly 50 and steering wheel 52 are is mounted in a generally vertical orientation on the simulator support frame 13 to the rear of the model towing vehicle 20. In this configuration, the simulator provides a better simulation of the act of driving and the user can get a better sense of how swerving while driving affects the trailer. The steering control assembly 50 includes a hanger member 64 for removably hanging the steering control assembly 50 from a cross member 66 of the simulator support frame 13. This allows the lateral position of the steering control assembly 50 to be adjusted as can be seen by comparing the position of the steering control assembly 50 shown in FIG. 9 versus that shown in FIG. 12.

The embodiment of FIGS. 9-14 also includes a camera housing 68 (see FIG. 13) for holding a video camera (not shown) that records the operation of the simulator when it is powered on. In one embodiment, the video camera is installed at track level to provide a "ground level" view of the operation of the simulator.

Figure 10:
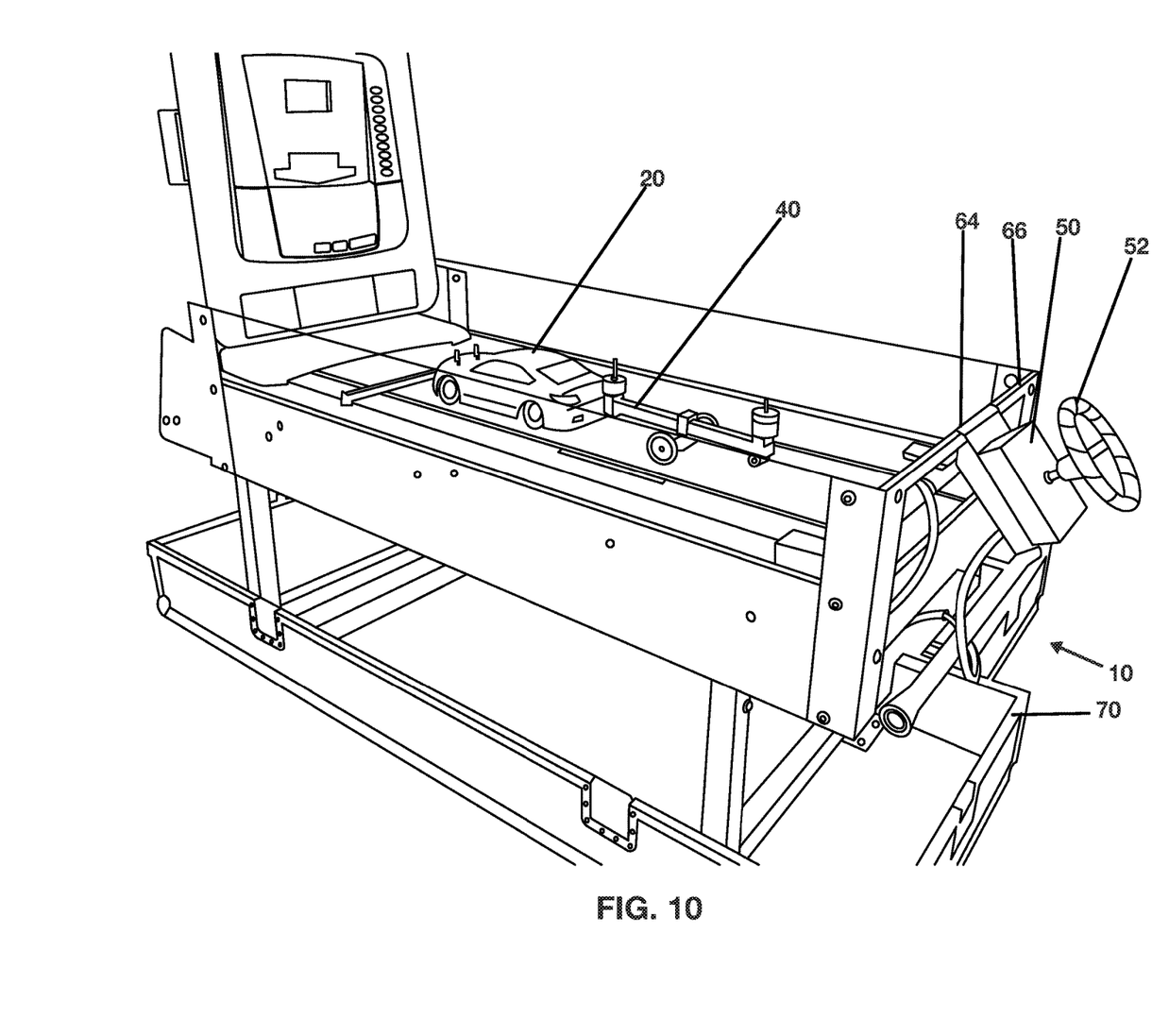
FIG. 10 is a side perspective view of the trailer sway simulator of FIG. 9.
Figure 11:
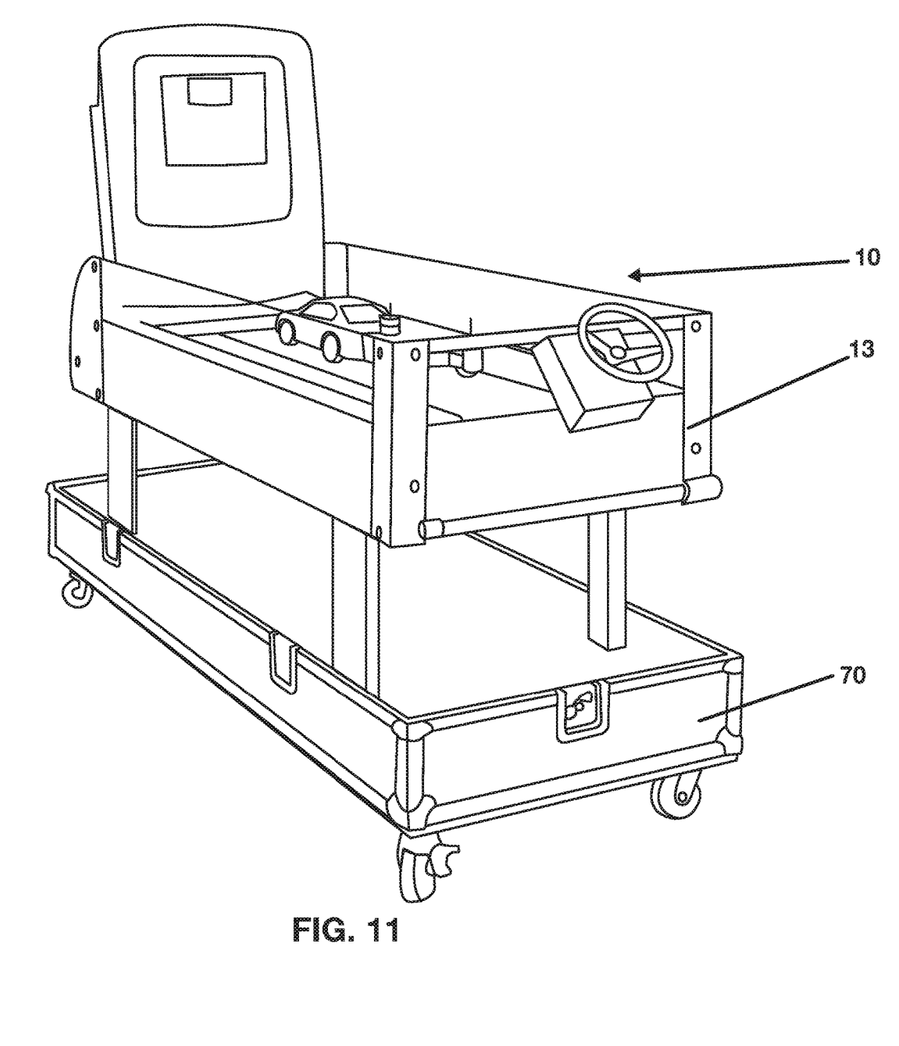
FIG. 11 is another perspective view of the trailer sway simulator of FIG. 9.
Figure 12:
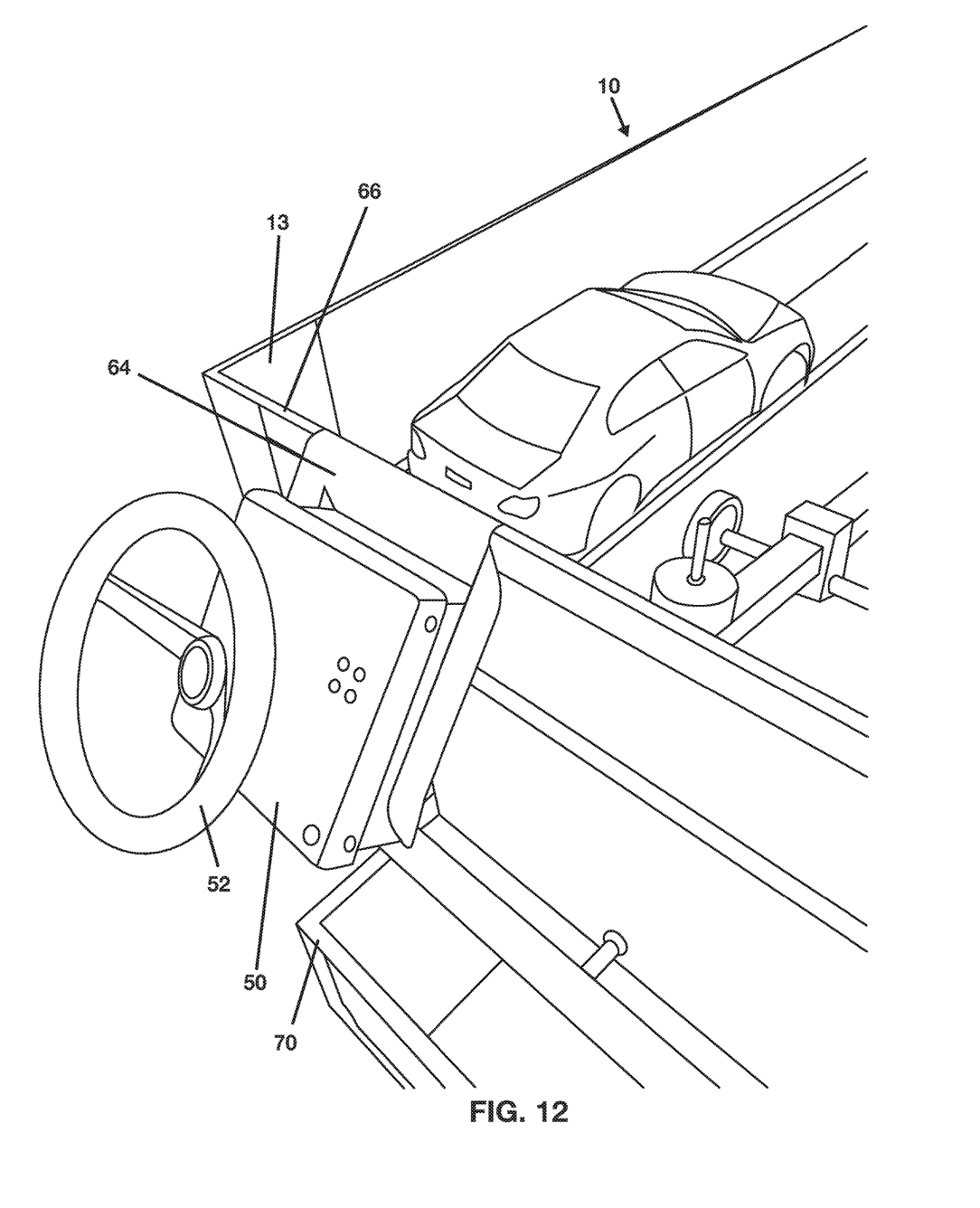
FIG. 12 is an enlarged view showing the steering wheel mounted to the trailer sway simulator of FIG. 9.
Figure 13:
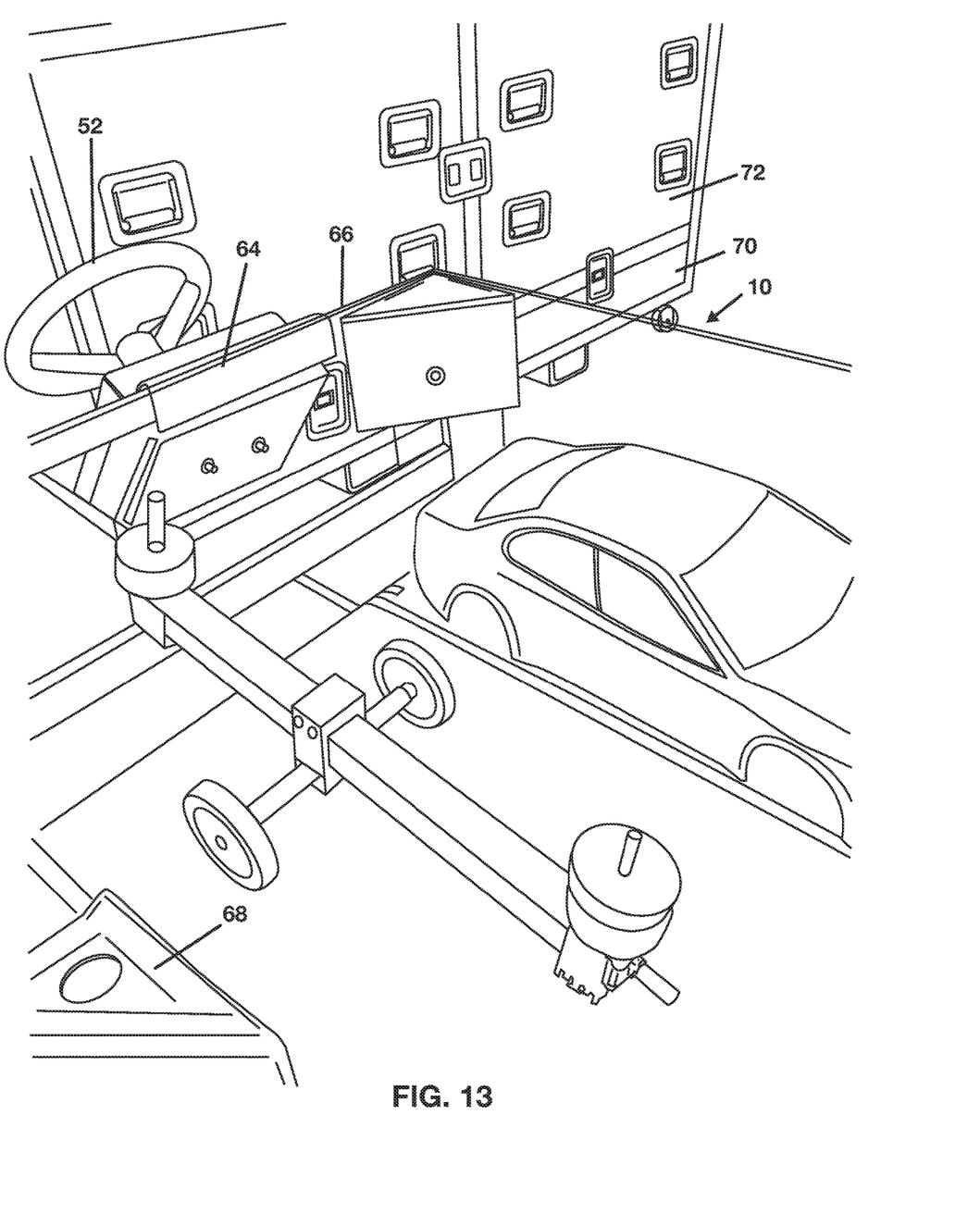
FIG. 13 is an enlarged top perspective view of the trailer sway simulator of FIG. 9 showing a camera housing.
Figure 14:
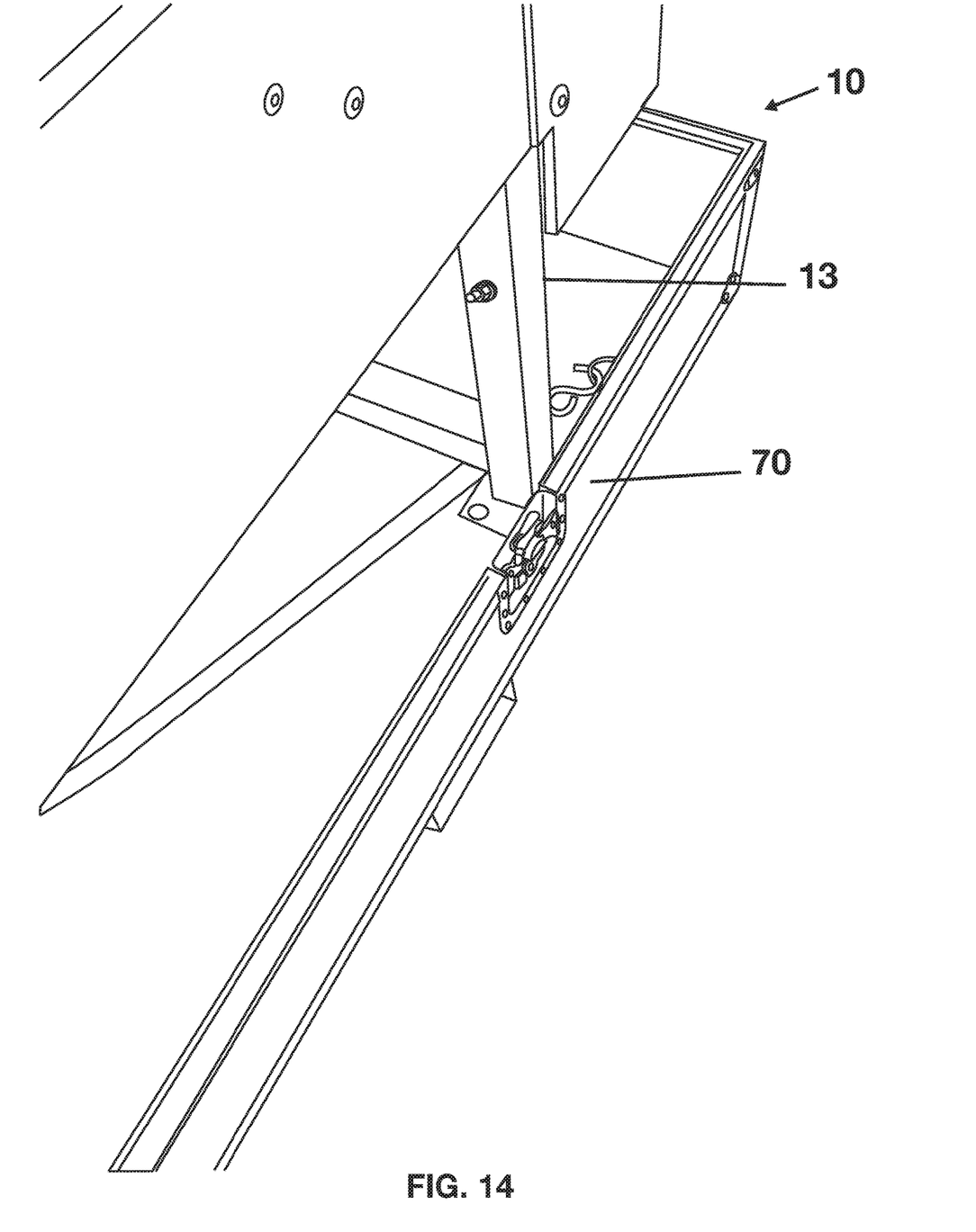
FIG. 14 is an enlarged top perspective view of the trailer sway simulator of FIG. 9 showing how the simulator is mounted to a storage box bottom platform.

In addition, in the embodiment of FIGS. 9-14 the simulator support frame 13 is mounted to a storage box bottom platform 70 as can bee seen in FIGS. 10, 11 and 14. The storage box bottom platform 70 is configured to receive a storage box top section 72 (see FIG. 13), which can fit over and encase the trailer sway simulator 10. In this configuration, the trailor sway simulator 10 can be easily and quickly boxed for shipment.

From the foregoing, it can be seen that the apparatus of the present invention possesses numerous advantages. It can provide a tool for educating the public on the importance of properly loading a trailer by demonstrating the stability of such a trailer as well as the instability of an improperly loaded trailer. It can physically demonstrate the relationship between towing speed and the likelihood of a crash with an improperly loaded trailer as well as the importance of reducing vehicle speed in the case of a trailer sway or whipping situation. It can help teach how towing combinations with different trailer configurations will react differently under the modeled conditions and can be customized to show the effect of variable trailer conditions on the stability of the towing combination.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. An apparatus for simulating a vehicle traveling on a road and towing a trailer, the apparatus comprising in combination:
    a motorized belt including a surface movable at a variable speed in a longitudinal direction;
    a support frame for supporting the motorized belt;
    a model towing vehicle positioned on the belt movable surface and including one or more steerable wheels that can be turned to steer the model towing vehicle laterally and a servo motor adapted to turn the one or more steerable wheels laterally in response to a servo control signal, wherein the model towing vehicle is coupled to the support frame via a coupling arm so that the model towing vehicle can move laterally on the motorized belt when the motorized belt is in motion in the longitudinal direction;
    a model trailer adapted for coupling to the rear end of the model towing vehicle and including removable weights for simulating weight distribution in a life size trailer; and
    a steering control assembly including a steering control mechanism and a servo driver configured to provide the servo control signal to control the servo motor in response to operation of the steering control mechanism;
    whereby when the motorized belt moves in the longitudinal direction, an operator can operate the steering control mechanism to steer the model towing vehicle laterally with respect to the motorized belt.

2. The apparatus of claim 1 wherein the steering handle comprises a steering wheel coupled to the servo driver.

3. The apparatus of claim 1 wherein the model trailer has a single axle configuration.

4. The apparatus of claim 1 wherein the model trailer has a dual axle configuration.

5. The apparatus of claim 1 wherein the model trailer removable weights are disposed on the model trailer to simulate the weight distribution of a full size trailer and a load in the full size trailer.

6. The apparatus of claim 2 wherein the steering wheel is disposed in a generally vertical orientation to the rear of the model towing vehicle.

7. The apparatus of claim 1 further comprising a camera for capturing track level images of the operation of the model towing vehicle or the model trailer.

8. The apparatus of claim 1 wherein the support frame is mounted to a storage box bottom platform that is configured to mate with a storage box top section and wherein the storage box top section is configured to fit over and encase the apparatus.

* * * * *